United States Patent [19]

Holladay et al.

[11] Patent Number: 4,817,389
[45] Date of Patent: Apr. 4, 1989

[54] FUEL INJECTION SYSTEM

[75] Inventors: Thomas E. Holladay, Lake Park; Thomas L. DuBell, Palm Beach Gardens, both of Fla.

[73] Assignee: United Technologies Corporation, Hartford, Conn.

[21] Appl. No.: 100,796

[22] Filed: Sep. 24, 1987

[51] Int. Cl.[4] .................................................. F02C 7/22
[52] U.S. Cl. .......................................... 60/739; 60/746
[58] Field of Search ............ 60/739, 742, 747, 39.141, 60/39.06, 746; 239/533.2

[56] References Cited

U.S. PATENT DOCUMENTS

| | | |
|---|---|---|
| 2,701,164 | 2/1955 | Purchas, Jr. et al. |
| 2,951,341 | 9/1960 | Henning, Jr. et al. ................. 60/739 |
| 2,963,082 | 12/1960 | Binford et al. .................... 60/39.141 |
| 2,963,862 | 12/1960 | Jay ........................................ 60/739 |
| 3,283,502 | 11/1966 | Lefebvre .............................. 60/730 |
| 3,335,567 | 8/1967 | Hemsworth ........................ 60/739 |
| 3,750,396 | 8/1973 | Tucker ................................ 60/739 |
| 3,763,650 | 10/1973 | Hussey et al. . |
| 3,915,188 | 10/1975 | Burnell et al. .................... 60/39.141 |
| 4,417,439 | 11/1983 | Sepulveda et al. ............... 60/39.141 |
| 4,711,085 | 12/1987 | Lyons ................................ 60/739 |

Primary Examiner—Donald E. Stout
Attorney, Agent, or Firm—Edward L. Kochey, Jr.

[57] ABSTRACT

A gas turbine engine combustor has a plurality of circumferentially fuel injectors. Two lower nozzles are pilot nozzles and are of the fuel pressure atomized type, and the majority of nozzles are of the air atomized type. A pressurizing valve maintains high fuel pressure to the pilot nozzles at all operating conditions. The fuel/air ratio for the pilot nozzles is optimized facilitating start up and increased stability during transient conditions.

7 Claims, 2 Drawing Sheets

FUEL INJECTION SYSTEM

The Government has rights in this invention pursuant to a contract awarded by the Department of the Army.

Technical Field

The invention relates to gas turbine engines and in particular to fuel injection systems therefore.

In gas turbine engines combustors receive air from the compressor and deliver hot gas to a turbine. A plurality of fuel injection nozzles supply fuel for combustion within the combustor.

It is desirable to ignite the fuel quickly and smoothly even under adverse conditions, without producing a surge. This includes starting of the engine at low temperatures and high altitudes. It is also important to maintain combustion during transient operation.

Improved performance requirements and restrictions on smoke emission have led to designs with improved atomization and mixing and where the fuel/air ratio is lean at the front end. An ignition envelope exists with the fuel/air ratio related to the local velocity, pressure and temperature of the gases with ignition only being possible within this envelope. The lean front end or the low local fuel/air ratio has increased the difficulty of keeping within this ignition fuel/air ratio envelope.

There are also advantages to the use of relatively low volatile fuel since such fuel may be handled with less hazard. This also increases the difficulty of obtaining and maintaining ignition.

Conventional pilot injectors exist which are turned on for ignition and off thereafter. This involves a time delay which can be particularly critical if the pilot is required during transient operation as well as purge requirements when the pilot is shut off. This also introduces control complications and concommitant expense.

A combination fuel injection system with airblast nozzles provides fuel to the nozzle tip at relatively low pressure because air energy is used to atomize the fuel in lieu of fuel pressure drop. When operating under adverse conditions such as high altitude where air energy and temperature are low (low temperature results in high fuel viscosity) it is difficult to atomize fuel. Further, during light-off and deceleration conditions the local fuel/air ratio is low. This invention addresses both of these problems by providing pressure atomizing pilots which utilize fuel pressure drop for atomization and redistribution of fuel to ensure an adequate fuel/air ratio at light-off and during low power deceleration conditions.

It is further important that all nozzles be properly atomized at all times to avoid puddling and/or pulsating combustion.

DISCLOSURE OF THE INVENTION

A fuel injection system has a plurality of circumferentially spaced fuel injectors arranged in a generally conventional manner. The majority of these fuel injectors are the conventional air atomized nozzle type. A minority, perhaps two, of these injections are of the pressure atomized nozzle type, these being the pilot nozzles. Each pilot has an igniter adjacent thereto.

The fuel pump supplies fuel to the engine fuel control which in turn supplies metered fuel to the air atomized nozzles through a variable restriction (pressurizing) valve which is capable of increasing the upstream pressure by flow restriction. The pressure atomized nozzles are connected upstream of this valve so that they receive high pressure fuel, which is required for good atomization, during all operating conditions.

The function of the pressurizing valve is to increase pressure to the pilot nozzles and to effect fuel distribution in favor of the pilot nozzles during light-off and low power operations. This introduces fuel at the location of the pilot nozzles rapidly at high pressure so that a properly rich fuel/air ratio with well atomized fuel is maintained for easy ignitability.

As fuel flow is increased, the variable restriction allows the fuel flow to increase significantly to the air atomized nozzles. Ignition time is decreased because of the relatively small volume which must be filled before fuel is ignited through the pilot nozzles. Furthermore, as fuel is introduced into the main nozzles it starts flowing first through the lower nozzles because of the static head component of the pressure drop. This permits the main nozzles to light-up sequentially from bottom to top producing a smooth light-off. Since air atomization is used there is good atomization even at the low fuel flows.

The pilot nozzles are maintained in operation at all times. Accordingly, during a transient such as rapid deceleration the pilots are already operating. The decrease in fuel flow requested by the main fuel control decreases the pressure with the variable restriction valve automatically closing thereby maintaining the full required atomization pressure for the pilot nozzles. Accordingly, stability during the transients is enhanced.

BEST MODE FOR CARRYING OUT THE INVENTION

Figure 1:
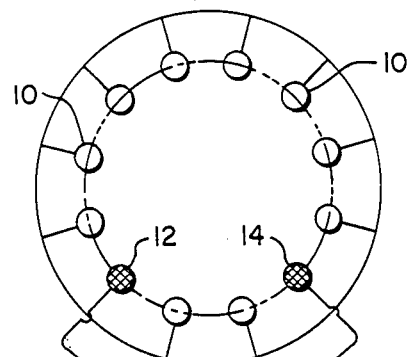
FIG. 1 is a schematic showing the circumferential distribution of the fuel injectors.
Figure 1:
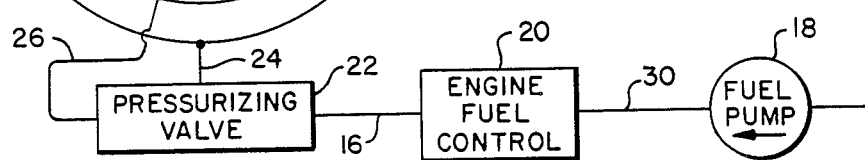

FIG. 1 illustrates a plurality of circumferentially spaced fuel injectors for injecting fuel into the combustor with the majority of these being main nozzles 10 of the air atomized type. Such nozzles as illustrated in U.S. Pat. No. 3,713,588 are characterized by the fact that atomization of the fuel is obtained from the energy of the air passing through the nozzle, so that good atomization of the fuel is obtained even at low fuel flows.

Two of the injectors are pilot nozzles 12 and 14 located at a lower elevation with respect to the other injectors. Fuel supply line 16 receives fuel from the fuel pump 18 through engine fuel control 20 and is connected directly to the pressurizing valve 22. A fuel supply line 24 is located substantially upstream of the main variable restriction action of the pressurizing valve 22 and delivers fuel directly to pilot nozzles 12 and 14. A fuel supply line 26 carries fuel to the airblast nozzles 10 being taken substantially downstream of the variable restriction action of pressurizing valve 22.

These pilot nozzles 12 and 14 are of the pressure atomizing type where atomization of the fuel is obtained from the pressure drop of the fuel itself. These usually include a swirling chamber whereby the fuel swirls at high velocity, prior to injection through an orifice, with the energy for the atomization coming from the pressure drop of the fuel itself. This type nozzle is characterized by the fact that atomization is sensitive to fuel pressure drop, but is relatively insensitive to air velocities.

Figure 2:
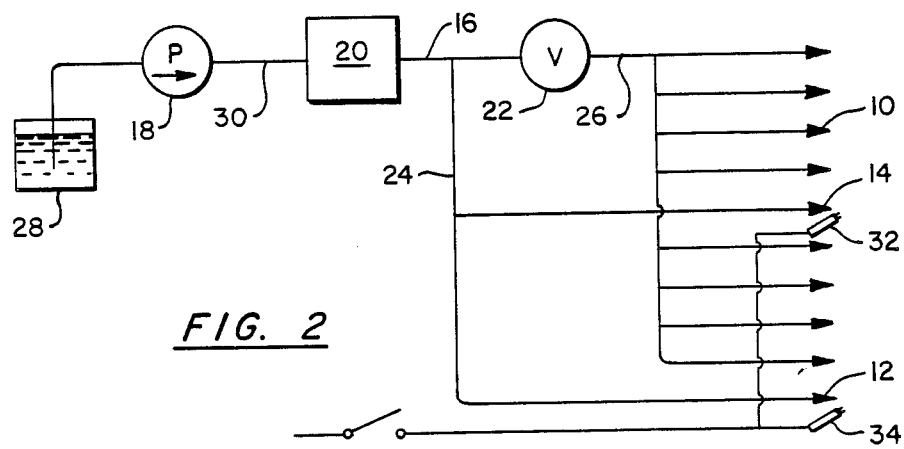
FIG. 2 is a schematic fuel flow diagram.

FIG. 2 is a rough schematic flow diagram of an extreme case of the control arrangement. The preferred arrangement including minimum flow to the main nozzles and some modulation of the pilot flow is described in connection with the pressurizing valve description. Fuel pump 18 draws fuel from fuel tank 28 delivering it through supply line 30. Engine fuel control 20 regulates the flow into the fuel distribution lines 16. A pressurizing valve 22 is used to regulate the pressure and flow in the fuel distribution line 24 and 26 to the pressure atomizing and airblast nozzles, respectively.

It can be seen that pressurizing valve 22 can be operated to maintain the desired high pressure of the fuel passing to the pilot nozzles 12 and 14. Additional flow passing through pressurizing valve 22 will fill distribution line 26. The lower main nozzles 10 will first start flowing.

For that reason it is preferred that the pilot nozzles 12 and 14 be located at a lower elevation to ignite the adjacent main nozzles will be the first ones to receive flow. These pilot nozzles, however, while being near the bottom should not be directly on the bottom. Such a bottom location could result in misfiring of the igniter should excessive fuel puddle at that location.

Figure 3:
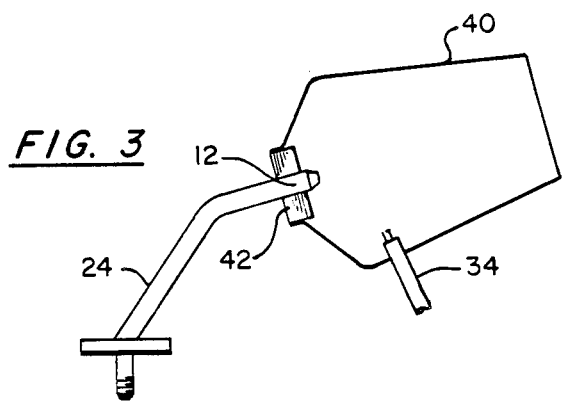
FIG. 3 is a view of the pressure atomized nozzles and an associated igniter.

FIG. 3 illustrates a section through the combustor 40 with a pilot nozzle 12 located therein and an associated igniter 34. Air swirl vanes 42 are located in a conventional manner to swirl the air for air-fuel mixing, although atomization of the fuel does not depend on this airflow. The air atomized type nozzles are arranged in a similar manner, but without the igniters, at the other locations.

As the gas turbine engine load is increased, pressure in line 16 is further increased with valve 22 approaching the full open position. The fuel flow through the pilot nozzles 12 and 14 increases slightly because of the pressure increase, while the fuel flow through the main nozzles increases substantially.

It is desirable to provide a distribution of fuel around the circumference which results in a uniform temperature without either a hot streak or a cold streak. A hot streak produces over temperature at the turbine beyond that which may be tolerated. A cold streak on the other hand results in increased temperature at other locations if the same average temperature is maintained.

The primary and dilution air downstream of the pilot nozzles can be tailored to reduce the potential for a hot or cold streak. This air tailoring in conjunction with good atomization and a circumferential mixing produced by the high energy air blast nozzles produces sufficient mixing to avoid deterioration in combustor or turbine life because of temperature streaks.

It can be seen that the pilot nozzles 12 and 14 remain in operation at all times. In the event of a rapid deceleration the fuel control valve 20 rapidly decreases fuel flow with pressure dropping in line 16. The pressurizing valve 22 automatically adjusts thereby providing an increased percentage flow through the pilot nozzles 12 and 14. This continues to maintain a good fuel/air ratio at these locations to retain ignition stability during such a transient.

During start-up of the gas turbine engine the fuel pump is started against the closed fuel control 20. As the fuel control is opened the pressure in line 16 increases with a majority of the fuel passing through pilot nozzles 12 and 14. Igniters 32 and 34 are located adjacent to the pilot nozzles with electrical energy being supplied for ignition purposes. Adequate fuel is supplied through the pilot nozzles to produce a relatively high fuel/air ratio which is well within the ignitability envelope. Since the fuel distribution line 24 volume is small relative to the distribution system 26, ignition delay is substantially reduced. For instance, tests have shown that compared to a conventional ignition time delay of 12 seconds, the delay has been reduced to 2 seconds.

Figure 4:
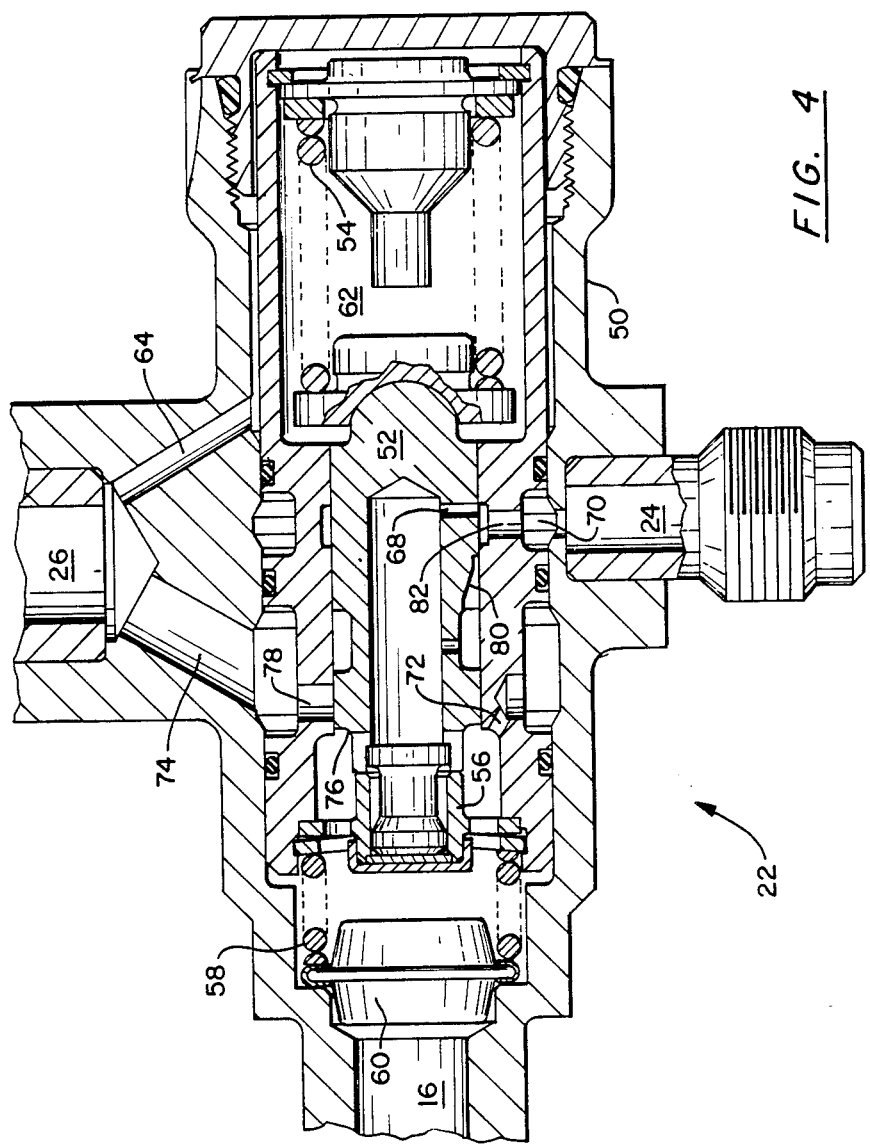
FIG. 4 is a view of the pressurizing valve illustrating the functional control of the system.

It is possible to carry out the control scheme either in the extreme form or in a modified form by the use of conventional sensing and feedback controls. The pressurizing valve 22 as illustrated in FIG. 4 offers a simplier reliable and light weight apparatus for carrying out the desired control of the system. It also incorporates several improvements over the earlier described extreme case.

The pilot nozzles have already been designed for the optimum fuel/air ratio at the low flow condition. Continued operation with only the pilot nozzles operating not only produces a poor temperature distribution but is also unnecessary since the fuel flow requirements are never so low that they are satisfied by the pilot nozzle requirement alone. Accordingly, a minimum flow bypass 72 to the main nozzles is incorporated.

As pressure is increased beyond the minimum flow requirements, the flow to the pilots would tend to increase. Since airflow has not been substantially increased at this time and since they already are designed for the optimum fuel/air ratio, this would result in local hot spots in the event of continued operation at this condition. Accordingly, the fuel flow to the pilot nozzles is dipped slightly before it is again increased.

The body 50 of the pressurizing valve encloses a floating piston 52. Biasing spring 54 urges the piston toward the inlet against shock absorber 56, spring 58 and filter 60. The spring 54 is enclosed within chamber 62 which is fluidly connected by conduit 64 to the main fuel pressure in line 26. This exposes the downstream of piston 52 to a pressure signal which is substantially representative of the pressure existing within the combustor, noting that the fuel pressure drop through the air atomized nozzles is nominal.

The inlet pressure from line 16 operates on the upstream side of the piston with the pressure differential between the inlet fuel pressure and the combustor pressure thereby operating to set the position of piston 52.

As illustrated, the piston is in its minimum pressure and minimum flow condition illustrating a flow of fuel through opening 68 which meters the pilot flow passing it through outlet chamber 70 into the pilot line 24. This device provides the desired flow to the pilots during initial condition. The bypass conduit 72 passes fuel at this minimum flow condition through the main outlet 74 into the main fuel distribution bypass 26. This bypass is sized to provide the difference between the pilot flow required and the minimum flow requirements of the engine.

As fuel pressure is increased under the influence of the engine fuel control 20, the piston 52 moves away from the inlet side. The recess 76 of the piston moves to uncover port 78 thereby increasing the fuel flow to the main nozzles. As opening 68 of the pilot line moves and starts to close off the characterized slot 80 moves into position over port 82. Therefore, after a slight dip in the pilot fuel flow caused by the throttling action, the flow is increased through the action of characterized slot 80.

It can therefore be seen that the pressurizing valve 22 carries out the desirable function of maintaining the desirable fuel/air ratio to the pilot while modifying the particular amounts in accordance with the particular combustor and engine design.

Accordingly, the rapid starting pilots then ignite the adjacent airblast nozzles which in turn ignite the remainder of the airblast nozzles as a static head is overcome and the manifold is completely filled. This results in smooth ignition because fuel is ignited as it is introduced to each nozzle and not allowed to puddle during manifold filling. It is much easier to ignite poorly atomized fuel with a pilot torch than directly with an electrical igniter.

We claim:

1. A fuel supply system for the combustor of a gas turbine engine comprising:
   a plurality of circumferentially spaced fuel injectors located for injection of fuel into the combustor;
   the majority of said fuel injectors being air atomized type main nozzles;
   the minority of said fuel injectors being pressure atomized type pilot nozzles;
   an igniter adjacent to each pilot nozzle;
   pump means for supplying fuel to said injectors;
   variable restriction means located between said pump means and said main nozzles; and
   a pilot fuel delivery conduit receiving fuel between said pump means and said variable restriction means for delivering fuel to said pilot nozzles, where by a high delivery pressure to said pressure atomized pilot nozzles may be obtained at all times.

2. A fuel supply system as in claim 1:
   at least one of said pilot nozzles being at a lower elevation.

3. A fuel supply system as in claim 2:
   all of said pilot nozzles being at a lower elevation but none being directly at the bottom of said plurality of fuel injectors.

4. A fuel supply system as in claim 1:
   said variable restriction means having a minimum flow bypass.

5. A fuel supply system as in claim 1:
   said variable restriction means responsive to fuel pressure upstream thereof, and opening proportionally in response to such pressure.

6. A fuel supply system as in claim 5:
   said variable restriction means having full open, minimum opening and intermediate positions;
   variable throttling means located in said pilot fuel delivery conduit and associated with said variable restriction means for slightly increasing the throttling of said pilot fuel delivery conduit at an intermediate position of said variable restriction means with respect to the throttling at said full open and said minimum opening positions.

7. A fuel supply system as in claim 1:
   means for sensing a measure of the combustor pressure:
   said variable restriction means responsive to the difference of said fuel pressure upstream and said measure of combustor pressure.

* * * * *